United States Patent [19]

Fagerburg et al.

[11] Patent Number: 4,939,236
[45] Date of Patent: * Jul. 3, 1990

[54] PROCESS FOR PREPARATION OF COPOLY(ARYLENE SULFIDE)

[75] Inventors: David R. Fagerburg; Joseph J. Watkins, both of Kingsport; Paul B. Lawrence, Blountville; Mark Rule, Kingsport, all of Tenn.

[73] Assignee: Eastman Kodak Company, Rochester, N.Y.

[ * ] Notice: The portion of the term of this patent subsequent to Aug. 8, 2006 has been disclaimed.

[21] Appl. No.: 404,811

[22] Filed: Sep. 8, 1989

Related U.S. Application Data

[63] Continuation-in-part of Ser. No. 322,335, Mar. 10, 1989, abandoned.

[51] Int. Cl.$^5$ .............................................. C08G 75/14
[52] U.S. Cl. ..................................... 528/389; 528/388
[58] Field of Search ......................................... 528/389

[56] References Cited

U.S. PATENT DOCUMENTS

| | | | |
|---|---|---|---|
| 3,869,434 | 3/1975 | Campbell et al. | 528/388 |
| 3,919,177 | 11/1975 | Campbell | 528/388 |
| 4,451,640 | 5/1984 | Shiiki et al. | 528/388 |
| 4,605,713 | 8/1986 | Hertz et al. | 525/537 |
| 4,605,733 | 8/1986 | Senatore | 528/388 |

*Primary Examiner*—Lewis T. Jacobs
*Assistant Examiner*—David W. Woodward
*Attorney, Agent, or Firm*—Charles R. Martin; William P. Heath, Jr.

[57] ABSTRACT

A process for preparing a copoly(arylene sulfide) corresponding to the structure

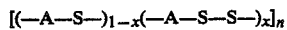

wherein x is in the range of 0.5 to 0.001 by reacting a mixture of a diiodoaromatic compound and elemental sulfur which contains less than 0.05 weight percent carbon.

6 Claims, No Drawings

PROCESS FOR PREPARATION OF COPOLY(ARYLENE SULFIDE)

This application is a continuation-in-part of Ser. No. 322,335, filed Mar. 10, 1989, now abandoned.

The invention relates to a process for the preparation of a copoly(arylene sulfide) of desirable color by heating a diiodoaromatic compound in the presence of elemental sulphur which contains less than 0.05 weight percent organic carbon Poly(arylene sulfide) (PAS) resins are thermosetting-thermoplastic polymeric materials with good thermal stability, unusual insolubility, resistance to chemical environments and inherent flame resistance. PAS resins additionally have good electrical insulative properties which make them ideal for electrical and electronic applications. Their excellent resistance to chemical degradation makes them ideal for use in chemical environments which involve organic solvents and strong mineral acids, such as coatings for pipes, tanks, pumps and other equipment.

Poly(phenylene sulfide) (PPS) is a commercial product which is generally produced by reacting p-dichlorobenzene with sodium sulfide in a polar organic solvent to produce PPS and the by-product sodium chloride. This process is known as the Macallum polymerization procedure and the basic process is disclosed in U.S. Pat. No. 2,513,188 and U.S. Pat. No. 2,583,941. An improvement on the Macallum polymerization procedure involves adding N-haloamides as catalysts in the procedure. The Macallum polymerization utilizes only chloroaromaic compounds.

Ser. No. 312,289, filed 02/13/89, now U.S. Pat. No. 4,855,393, discloses a process for preparation of a copoly(arylene sulfide) wherein elemental sulfur is reacted with diiodobenzene.

U.S. Pat. No. 4,786,713 discloses the copoly(arylene sulfide) resulting from this process.

Although the process disclosed in Ser. No. 312,289 can be used to prepare a very desirable polymer, the color of the polymer could be improved.

We have now discovered that the color of the polymer prepared following the disclosure of Ser. No. 312,289 can be materially improved by using elemental sulfur with a lower carbon content.

The vast majority of units in the copolymer prepared by the process of this invention are the (—A—S—) unit and the number of (—A—S—S—) or disulfide units are small compared to the number of (—A—S—) units. Generally, the fraction of (—A—S—S—) units is in the range of 0.5 to 0.001, based on the combined number of both (—A—S—) and (—A—S—S—) units. Thus, the copolymer prepared by the process of the invention can be represented as

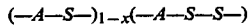

where x is in the range of 0.5 to 0.001. The sequence of (—A—S—) and (—A—S—S—) units is thought to be random throughout the molecular chain. The (—A—S—) units are defined as the amount of sulfur per A ring in excess of 1.0.

The size of the polymer chain can conveniently be expressed as the total number of each kind of unit in the chain. Therefore, the copoly(arylene sulfide) prepared by the process of this invention can be more specifically expressed as corresponding to the structure

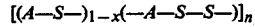

wherein n, the degree of polymerization, is at least 100, preferably at least 200 and more preferably in the range of 500 to 5,000 as determined by melt viscosity measurement at 300.° C. The degree of polymerization when A is p-phenylene can be calculated using the relationship $\log(n) = 1.473 + 0.2873 \times \log(\text{melt viscosity})$ where melt viscosity is measured in poise.

In the process of the present invention a diiodoarylene compound corresponding to the structure

where A is a divalent arylene radical is reacted with elemental sulfur to produce a substantially linear copoly(arylene sulfide) having both (—A—S—) units and (—A—S—S—) units.

Diiodoaromatic compounds which can be utilized in the present process include unsubstituted or substituted aromatics which have two iodine substituents. Suitable diiodoaromatic compounds include hydrocarbon aromatics, nitrogen-containing aromatics, sulfur-containing aromatics and oxygen-containing aromatics. Typical hydrocarbon aromatics include benzene, biphenyl, and condensed ring aromatics such as naphthalene and anthracene. Typical sulfur-containing aromatics include, for example, thiophene and benzothiophene. Typical nitrogen-containing aromatics include pyridine and quinoline. Suitable oxygen-containing aromatics are, for example, furan, dibenzofuran, diphenyl ether, benzophenone, etc Substituted diiodoaromatic compounds suitable for use with the present invention include aromatic sulfones, diarylethers, diarylcarbonyls, diarylsulfides and the like.

The aromatic starting materials may be substituted by one or more alkyl groups, preferably alkyl groups having from 1-6 carbon atoms. Specially preferred alkyl groups are methyl, ethyl, propyl and butyl groups. There is no limitation on the spatial arrangement of the substituents, for example, the substituents may be on a carbon adjacent to an iodine bearing carbon or may be on a carbon atom further removed from the iodine bearing carbon.

Additional substituents on the aromatic compounds may include phenyl, halogen, hydroxy, nitro, amino, $C_{1-6}$ alkoxy, and carboxylate and carboxylic acid substituents, as well as aryl sulfones and aryl ketones.

Preferred diiodoaromatic compounds are the diiodobenzenes, diiodonaphthalenes, diiodobiphenyls, diiododiphenyl ethers and diiodotoluenes which may be unsubstituted or substituted with any of the substituents noted above.

Specific diiodoaromatic compounds suitable for the present invention include p-diiodobenzene, m-diiodobenzene, p,p'-diiodobiphenyl, m,p'-diiodobiphenyl, p,p'-diiododiphenyl sulfone, p,p'-diiododiphenyl ether, and 2,6-diiodonaphthalene. P,p'-diiodobenzophenone, p-diiodobenzene, p,p'-diiodobiphenyl, and p,p'-diiododiphenyl ether are most preferred.

The diiodoaromatic starting materials of the present invention may be prepared by any suitable process. For example, the diiodoaromatic compounds may be prepared by standard liquid or gas phase iodination reactions.

Sulfur is reacted as elemental sulfur and may consist of any of the standard forms which are possible for elemental sulfur. That is, the sulfur may be present in any of its allotropic modifications such as orthorhombic cyclooctasulfur ($S_8$) or any other cyclic elemental sulfur such as any of the cyclosulfur species having 6-12 sulfur atoms. Additionally, any crystalline form of sulfur may be used in the present reaction. Surprisingly, impurities in the elemental sulfur do not appear to affect the efficiency or selectivity of the present polymerization reaction. The sulfur preferably has a purity of about 98%-100%, although sulfur having a lower degree of purity may be used. This lack of sensitivity to the presence of impurities in the sulfur is advantageous to the present process when used as a commercial process since highly purified sulfur is not required and the associated expense is not incurred.

In this invention the carbon content of the sulfur is quite low. Specifically the amount of carbon is less than 0.05, preferably less than 0.025 and more preferably less than 0.01 weight percent based on the weight of the sulfur.

In this invention the carbon in the sulfur is in the form of organic carbon. By the term "organic carbon" we mean that the carbon is bonded in organic compounds. Although these compounds have not been identified, it is thought the organic compounds are entirely hydrocarbons. In this invention there is no significant amount of elemental carbon present in the sulfur.

In the process of the present invention sulfur reacts with a diiodoaromatic compound, eliminating elemental iodine and forming the PAS as shown below.

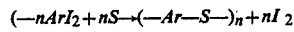

$$(-nArI_2 + nS \rightarrow (-Ar-S-)_n + nI_2)$$

The formation of polymer is not sensitive to the relative stoichiometry of the diiodoaromatic compound and sulfur. Accordingly, an excess of sulfur or an excess of diiodoaromatic compound may be used in the polymerization process. When excess sulfur is used, some disulfide linkages are observed in the polymer. Decreasing amounts of sulfur result in decreasing levels of disulfide linkages in the final polymer. When the diiodoaromatic compound is present in excess, polymerization to high polymer can still occur, if the excess diiodoaromatic compound is removed during final polymerization.

The polymerization reaction is preferably carried out in the absence of solvent by merely heating and reacting the sulfur and diiodoaromatic compound. Under these conditions, the diiodoaromatic compound itself acts as a solvent for the sulfur which is melted thereby forming a substantially homogeneous solution enabling a facile and complete reaction.

In another embodiment, the diiodoaromatic compound can be dissolved in an organic solvent which is inert to the reaction conditions, i.e., which is inert to reaction with iodine and sulfur. High boiling inert aromatic solvents are preferred such as, for example, aromatic hydrocarbons, diarylsulfides, diarylethers and diarylsulfones. It is preferable to use a solvent which corresponds to the diiodoaromatic compound which is being polymerized. Thus, for example, in the polymerization of diiodobenzene with sulfur, one might use benzene, toluene or naphthalene as a solvent.

It is also possible to peform the polymerization reaction of the present invention by solid state polymerization. Solid state polymerization enables very high molecular weights and melt viscosities to be achieved. After an initial melt polymerization (or alternatively solution polymerization) has been performed, the product is cooled to a solid state. Further heating and polymerization in the solid state under vacuum or inert gas flow dramatically increases the molecular weight allowing weight average molecular weights in excess of 100,000 to be achieved. It is significant to note that substantially no cross-linking occurs during the solid state or melt polymerization processes. The very high molecular weight copolymers which are produced after the solid state polymerization are still substantially linear and have excellent film and fiber forming properties.

During the polymerization reaction between the diiodoaromatic compound and sulfur elemental iodine is produced and evolves from the reaction melt or solution, or solid. Removal of the elemental iodine provides a driving force for completion of the polymerization reaction. The iodine may be recovered by passing a stream of air or an inert gas such as nitrogen or argon over or through the reaction mass at atmospheric or superatmospheric pressure or alternatively by applying a vacuum to the reaction apparatus. The elemental iodine may be collected and used as a commercial product or as a reactant for further chemical processes. The present reaction, therefore, does not result in wasted reaction products since both the PAS and elemental iodine are useful commercial chemical products.

The polymerization reaction is generally conducted at a temperature above about 175° C. Although the reaction may be conducted at temperatures below 175° C., the polymerization reaction is much slower. There is no particular upper temperature limit on the polymerization reaction, which may be conducted at any temperature below the decomposition temperature of the diiodoaromatic compound. For most polymerization reactions, temperatures in the range of about 175–400° C. will be suitable, although for particular diiodoaromatic compounds temperatures in excess of 400° C. may be used. Particularly preferred temperature ranges are from about 180° –350° C.

The reaction is generally conducted for a period of at least one-half hour and is continued for up to about 10 hours or longer, and reaction times approaching infinity are theoretically possible. The exact reaction time will depend on the diiodoaromatic compound, the engineering requirements of the process, and the specific molecular weight, viscosity and physical properties of the desired product.

The polymerization reaction may be carried out in a batch reaction vessel or may be carried out as a semicontinuous or continuous process. Agitation of the reaction mixture is optional, however agitation or stirring assists in the production and yield of the polymeric product. Agitation of the reaction mixture may be accomplished by any known method, such as mechanical stirring or by passing a stream of inert gas through the reaction mixture.

In a preferred embodiment, the polymerization reaction is conducted on a continuous basis with the diiodoaromatic compound and sulfur being combined in a continuous staged reactor to form a reaction melt. An inert gas such as nitrogen or argon is passed through the melt, preferably in a countercurrent direction, thereby accomplishing agitation and mixing of the reaction melt and at the same time removing the elemental iodine which is evolved and sweeping it out of the reactor. Alternatively, a vacuum may be applied to the reactor to remove the elemental iodine as it is generated. It should be noted that the reaction proceeds equally well under batch conditions and combinations of batch and continuous processes are considered to be well within the scope of the present invention.

The copolymer produced by the process of this invention is useful for preparation of various shaped articles such as pellets, fibers and molded articles. The polymer can be prepared into these shaped articles by conventional processes, such as injection molding and melt spinning.

Since there are no alkali metal containing materials in the reaction, there are no substantial quantities of alkali metal in the polymer matrix. Typically, there is less than 100 weight parts per million alkali metal, preferably less than 10 weight parts per million, based on the weight of the copoly(arylene sulfide). The absence of substantial quantities of alkali metal greatly enhance the capability of the polymer to be melt processed, particularly melt spun into fibers.

The copoly(arylene sulfide) and particularly the copoly(phenylene sulfide) produced by the process of this invention have an adjustable rate of crystallization, due to the presence of the disulfide linkages. Since the concentration of disulfide linkages can be varied over a wide range, the rate of crystallization can be readily adjusted to suit the technological application without unduly sacrificing other desirable characteristics of the polymer. In addition, the rate of crystallization can be further enhanced by the addition of conventional nucleating aids such as talc, terephthalic acid, silica or the like for those applications where extremely fast rates are desired.

An important aspect of this invention is reacting the diiodoaromatic compound and elemental sulphur in the absence of a basic material. Examples of basic materials which are not present in our reaction include dithionates, lithium hydroxide, sodium hydroxide, potassium hydroxide, rubidium hydroxide, cesium hydroxide, magnesium hydroxide, calcium hydroxide, strontium hydroxide, sodium hydroxide, sodium carbonate, potassium carbonate and the like.

Other features of the invention will become apparent in the course of the following descriptions of exemplary embodiments which are given for illustration of the invention and are not intended to be limiting thereof.

EXAMPLE 1

This example illustrates preparation of a poly(arylene sulfide) which was prepared in accordance with the process of the invention and exhibits a desirable color.

Into a 500 ml 3-neck round bottom flask are weighed the following: 32 g sulfur (0.998 mol) with a carbon content of 0.02 weight %, and 410.0 g p-diiodobenzene (1.24 mol, 24.5 mol % excess) DSC purity of the sulfur was determined to be 99.89% and the ash was 0.03 wt %. The flask was fitted with a 350 mm long Vigreux column, a mechanical stirrer through the center joint, and an inlet tube for a slow air sweep. The column was attached via a distillation head and a takeoff tube to a distillation receiver which was cooled in dry ice. The receiver was connected to a vacuum source. The flask was maintained at 200 torr pressure and immersed in a metal bath controlled at 230° C. It was held under these conditions for 2.5 hr, at which time the bath temperature was raised to 240° C. After 1.5 hr, the pressure was reduced to 120 torr, held for 0.5 hr and then reduced to 60 torr where it was held for an additional 0.5 hr followed by reduction of the pressure to 30 torr for an additional 0.5 hr. The bath temperature was raised to 250° C. and reaction flask was removed from the metal bath, repressurized with nitrogen, and allowed to cool under nitrogen. The polymer yield was 107.9% of a dark tan polymer with low melt viscosity which thoroughly crystallized in less than 2 min on the outside surface of the melt. Solid state polymerization of 7.3 g of the granulated product under a nitrogen flow of 1.0 ft$^3$/hr in a glass tube held in a metal block at 240° C. for 24 hr gave a light tan material that was pressed into clear, medium-yellow films (20 mil thickness) at 300° C.

EXAMPLE 2

This example illustrates preparation of a poly(arylene sulfide) which was prepared in accordance with the prior art and exhibits an undesirable color.

The preparation of Example 1 is repeated but using sulfur which contains 0.25 weight % carbon (average of 3 analyses). The sulfur purity by DSC was 99.96% and the ash content was 0.01 wt %. The final product of the melt reaction was a dark brown material. When 7.3 g was solid state polymerized as in Example 1, the final polymer color was still a dark brown. Pressed films were quite dark brown in a 20 mil section. Then through the DSC purity and the wt % ash of the sulfur used in this example are better than the corresponding values for the sulfur of Example 1 the polymer is more colored than the polymer of Example 1.

EXAMPLE 3

This example illustrates preparation of another poly(arylene sulfide) which were prepared in accordance with the process of this invention and exhibits desirable color.

The preparation of Example 1 is repeated but using sulfur which contains <0.01% carbon. The final product of the melt reaction was a tan material When 7.3 g was solid state polymerized as in Example 1, the final polymer color was a pale yellow. Pressed films were yellow in a 20 mil section.

EXAMPLE 4

This example illustrates preparation of another poly(arylene sulfide) which was prepared in accordance with the prior art and exhibits undesirable color.

The preparation of Example 1 is repeated buy using sulfur which contains 0.20% carbon. The final product of the melt reaction was a dark brown material. When 7.3 g was solid state polymerized as in Example 1, the final polymer color was still a dark brown. Pressed films were quite dark brown in a 20 mil section.

EXAMPLE 5

This example illustrates preparation of another copoly(arylene sulfide) which were prepared in accordance with the process of this invention and exhibits desirable color.

The preparation of Example 1 is repeated buy using sulfur which contains <0.01% carbon and 0.019 g of paraffin wax (84.08% C) was added to obtain a final carbon content of the sulfur of 0.05 wt %. The final product of the melt reaction was a brown material When 7.3 g was solid state polymerized as in Example 1, the final polymer color was a pale yellow. Pressed films were dark yellow in a 20 mil section.

EXAMPLE 6

This example illustrates preparation of a copoly(arylene sulfide) which was prepared in accordance with the process of the prior art and exhibits undesirable color.

The preparation of Example 1 is repeated by using sulfur which contains <0.01% carbon and 0.038 g of paraffin wax (84.08% C) was added to obtain a final carbon content of the sulfur of 0.1 wt %. The final product of the melt reaction was a dark brown material. When 7.3 g was solid state polymerized as in Example 1, the final polymer color was dark brown. Pressed films were dark brown in a 20 mil section.

We claim:

1. A process for producing elemental iodine and a copoly(arylene sulfide) corresponding to the structure:

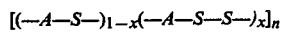

wherein A is a divalent substituted or unsubstituted aromatic radical, x is in the range of 0.5 to 0.001 and n is at least 200,
comprising
(A) reacting in the absence of a basic material a diiodoaromatic compound and elemental sulfur which contains less than 0.05 weight percent organic carbon at a temperature above about 175° C. to produce the elemental iodine and the copoly(arylene sulfide), and
(B) recovering the elemental iodine.

2. The process of claim 1, wherein the diiodoaromatic compound is selected from the group consisting of diiodobenzenes, diiodonaphthalenes, diiodobiphenyls and diiodotoluenes.

3. The process of claim 1, wherein said diiodoaromatic compound is p-diiodobenzene, m-diiodobenzene, p,p'-diiodobiphenyl, p,p'-diiododiphenyl ether, or 2,6-diiodonaphthalene.

4. The process of claim 1, wherein said reacting step is conducted at a temperature between about 175°-400° C.

5. The process of claim 4, wherein said reacting step is conducted at a temperature between about 180°-350° C.

6. A process for producing elemental iodine and a copoly(phenylene sulfide) corresponding to the structure:

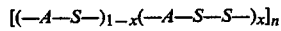

wherein A is a divalent unsubstituted phenylene radical, x is in the range of 0.5 to 0.001, and n is at least 400,
comprising
(A) reacting in the absence of a basic material a mixture of diiodobenzene and elemental sulfur which contains less than 0.05 weight percent organic carbon at a temperature in the range of 180° to 350° C. to produce the elemental iodine and the copoly(phenylene sulfide), and
(B) recovering the elemental iodide.

* * * * *